UNITED STATES PATENT OFFICE.

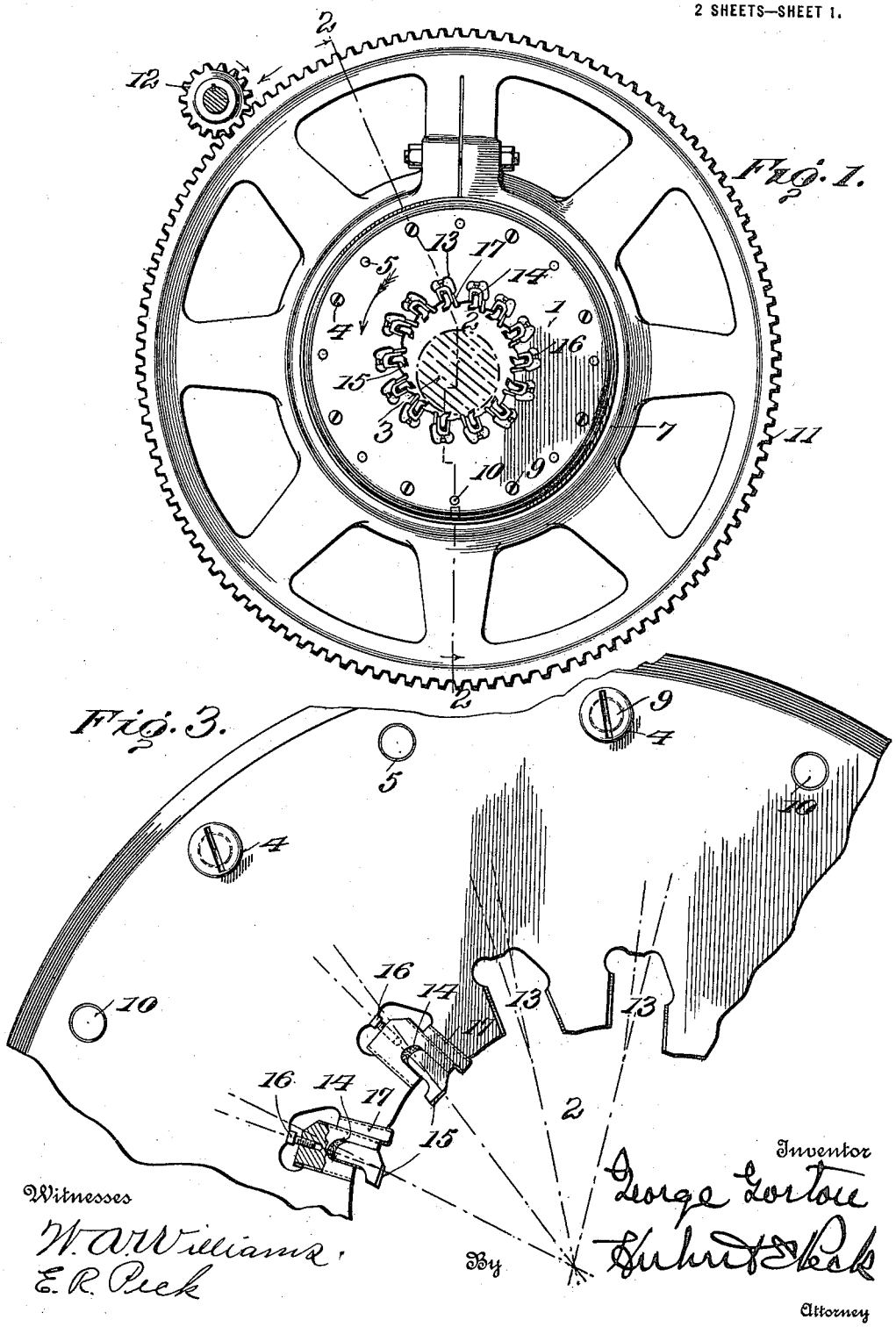

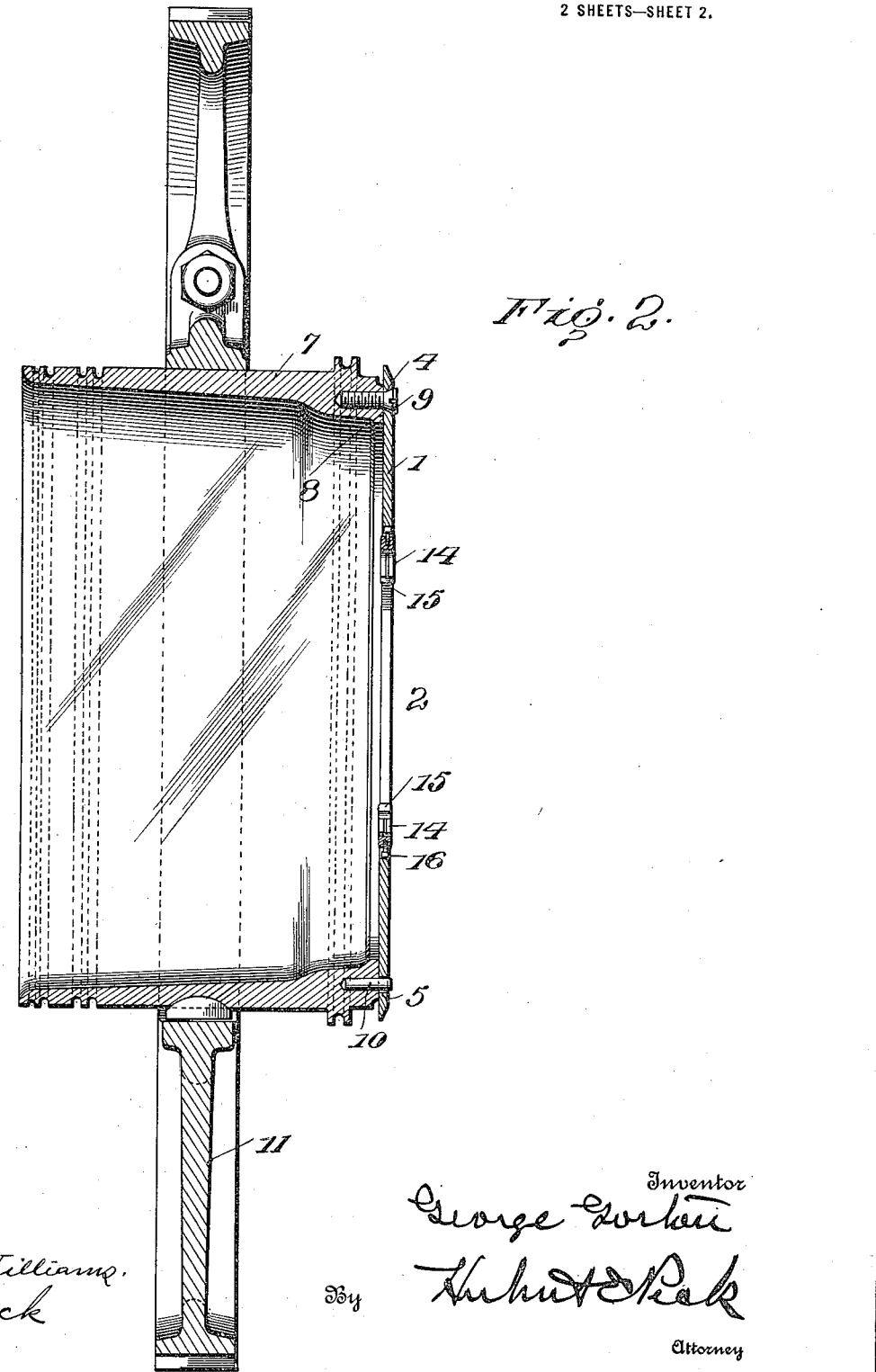

GEORGE GORTON, OF RACINE, WISCONSIN.

CUTTING-OFF SAW.

1,153,682.  Specification of Letters Patent. Patented Sept. 14, 1915.

Application filed August 11, 1909. Serial No. 512,337.

*To all whom it may concern:*

Be it known that I, GEORGE GORTON, a citizen of the United States, residing at Racine, Racine county, State of Wisconsin, have invented certain new and useful Improvements in Cutting-Off Saws; and I do hereby declare the following to be a full, clear, and exact description of the invention, such as will enable others skilled in the art to which it appertains to make and use the same.

This invention relates to certain improvements in metal cutting devices or more particularly to what are known in the art as cutting off saws or tools; and the objects and nature of the invention will be readily understood by those skilled in the art in the light of the following description of the accompanying drawings illustrating what I now consider my preferred embodiment.

The object of my invention is to provide a rotary drive whereby "high speed" or "high duty" steel cutters can be driven to their full capacity for the rapid and economical severing of large, as well as small, hard, as well as soft, metal bars. To this end, I arrange renewable or removable cutters around and projecting into the central work receiving opening of a high speed rotary carrier, blade or drum adapted to be carried by a suitable feed carriage and having an exterior driving gear or wheel of relatively large diameter.

To the best of my knowledge and information no means have heretofore been provided whereby high duty cutters could be operated to even approximately their full capacity in cutting off machines and the like, and hence it has been heretofore impossible to gain the full utility and advantage of such cutters for the purpose of rapidly and economically severing metal bars and the like.

Heretofore, it has been proposed to cut saw teeth around the edge of a central opening in a peripheral-driven disk to perform the functions of a hack saw for cutting tubes and small or soft stock but such devices to the best of my information and belief never went into use because of the inefficiency, slowness and cost thereof as compared with the cheap power hack saws and the small inexpensive saw blades thereof.

Center driven rotary saws having high speed steel insertible teeth wedged in pockets in the periphery thereof, have been used for cutting off steel and other bars, but such saws are slow in action and expensive to operate and maintain because of the center drive and the tendency of such saws to vibrate or chatter and "snake" or deflect laterally, and thereby shake the inserted teeth loose and from the blade. In these old center driven saws there is a short leverage on the work, and the act of wedging up one tooth in the periphery of the blade tends to loosen the other teeth therein. This old type of saw cannot operate at a speed anywhere near the capacity of the modern "high duty" steel cutters, and hence there is great inefficiency in the operation thereof.

Referring to the accompanying drawings: Figure 1 is an elevation of my improved metal stock cutter showing the same fastened to its supporting and driving drum and showing the driving gear on the drum, the gear driving pinion being shown, the work being indicated by dotted lines. Fig. 2, is a longitudinal section taken diametrically through the drum and cutter disk. Fig. 3, is a plan view of a portion of the disk, on an enlarged scale, certain of the insertible cutting tools or blades being removed and another being partially broken away.

In the drawings, the cutter disk is indicated by 1, and this disk is formed flat with a central circular opening 2, to receive, and of greater diameter than, the work or stock to be cut off; the work or stock being indicated by 3. This cutter disk is composed of strong comparatively heavy metal, such as steel. For instance, I have with good results employed cutter blades or disks composed of 60 carbon steel, the disks being from about one quarter to about seven sixteenths of an inch in thickness, although of course I do not so limit my invention, as the thickness of the flat metal blade or disk will depend on the work to be performed, the diameter of the blade and the diameter of the central work receiving opening thereof. In the specific example illustrated, I show the disk or blade with its front and rear side faces parallel with the blade beveled off circumferentially around its edge portion at the front face thereof, and adjacent to its periphery or outer edge provided with a surrounding series of uniformly spaced transverse holes 4, countersunk to receive securing screws and alternating with perforations 5, to receive studs or pins rigid with and projecting from the blade carrying drum.

7, is a strong heavy metal drum in the form of an open end cylinder and at its front end edge 8, formed to receive the rear flat face of the blade or disk and have the same secured removably thereto by the machine screws 9, passed through countersunk holes 4, and by the pins or studs 10, rigid with and projecting from the drum edge and fitting into the perforations 5, to properly center and hold the blade or disk. The arrangement is such that the disk can be most accurately and rigidly secured to the drum, yet so that the disk can be readily removed from the drum when necessary. The drum is externally finished and formed to assume a horizontal position and rotate in suitable strong boxes or bearing surrounding the same and carried by or forming a part of a suitable movable feed carriage.

Suitable means are provided at the exterior of the drum and cutter blade or disk to rotate the drum at the desired rate of speed while the feed carriage is being moved to carry the blade through the work at the desired high rate of speed. In the specific example illustrated, I show the drum driving gear wheel 11, concentrically fitted on the exterior of the drum about midway between its ends and securely keyed or otherwise fastened thereon in such a manner that the driving gear is concentric with the central round opening in the blade or disk. The gear is shown as of far greater external diameter than the diameter of the disk central opening and with peripheral teeth meshing with a comparatively small-diameter driving pinion 12, arranged above the drum and to one side of the vertical diameter of the gear. This pinion is suitably mounted in the feed carriage that carries the drum and is driven in any suitable manner from any suitable source of power.

The disk or blade 1, is provided with any suitable high duty cutters arranged around its central opening and these cutters are rigidly locked or affixed thereto in any suitable manner so as to be renewable or removable therefrom.

In the particular embodiment shown in the drawings, for the purpose of illustrating an example, I show the blade formed with a series of similar uniformly spaced pockets 13, arranged around and opening into the central work-receiving opening, and receiving an old form of high speed cutters now found on the market. I do not claim to be the inventor of the cutters *per se*, shown in the drawings but merely show such old cutters of commerce for convenience of illustration.

The cutters 14, illustrated have projecting points 15, and are tightly locked in the pockets 13, by wedges 17, and carry screws 16 to bear against the floors or abutments of the pockets, but I do not wish to limit my invention thereto, as I claim to be the first to provide a rotary drive for high speed duty cutters, whereby said cutters can be worked to full capacity, and wherein high speed or duty cutters of any construction are arranged around the central opening of a rotary blade whether such cutters are individually wedged in pockets or are otherwise locked or secured to the blade against lateral deflection and supported to sustain the tremendous thrust of the cutters while at work.

The cutting or working edge portions 15, of all the cutters are composed of what is known as "high speed" steel, or "high duty" cutters, that is cutters composed of metal such as steel of such composition or so treated as to be capable of cutting hard metal, such as steel, at an exceedingly high rate of speed without fusing or losing in efficiency. In other words, I employ radially arranged converging cutters, the working portions of which are composed of a metal that will retain its cutting efficiency at high temperatures, so that I can feed my disk at the highest possible speed through the work, even though the work be a steel bar, while rotating the disk at the desired rate of speed to sever the work in the shortest possible length of time.

In my saw, the blade is fastened entirely around its periphery, its strongest portion, and is driven from its periphery, and I arrange the cutters radially and converging at a central opening in the blade so that I secure an exceedingly powerful leverage on each cutter while at work and can operate the cutters at an exceedingly high rate of speed without chatter or vibration of the blade and without danger of the cutters flying from the blade under centrifugal action. In fact, with my blade I have cut through six inch steel bars, one after the other, in less than sixty seconds each, and without disadvantageous vibration.

Each cutter, around the central opening of my blade, can be keyed or wedged in as tightly as desired without causing the slightest deflection or distortion of the blade and without loosening adjacent cutters, but on the contrary, the proper tightening of cutters in my blade tends to tighten adjacent cutters. Furthermore in my blade, I employ a considerably less number of cutters than in the old type of saw, and there is no lateral deflection of the blade while at work, as in the old type of saw, tending to knock the cutters loose from their pockets, particularly in view of the fact that every alternate cutting edge is usually wide with the intervening cutter edges narrow.

What I claim is:—

1. In a metal cutting off machine, a blade adapted to be rotated by exterior driving means and having a central work receiving opening with pockets at their inner ends opening into said opening, in combination with cutters adapted to said pockets and having inner high duty working points within said opening, and means for rigidly locking said cutters to said blade to sustain the thrust thereof in action and whereby said cutters are rendered removable.

2. In metal cutting off machinery, a blade formed around its outer edge for securing to high speed rotary driving means and having a central work receiving opening, in combination with removable cutters arranged around said opening and having converging inner working points therein, and means rigidly locking said cutters to said blade to distribute the thrust of the cutters in action thereon and whereby the cutters are rendered removable.

3. In metal cutting off machines, a high speed drive for driving "high duty" cutters to their capacity comprising an exteriorly driven rotary blade having a central work receiving opening, in combination with renewable "high duty" cutters arranged around said opening and having inner working points within the opening, and means for locking said cutters to said blade for sustaining the outward thrust thereof while in action, and whereby said cutters are rendered removable.

4. In metal cutting off machinery, a high speed rotary member having a central work receiving opening formed with cutter-thrust sustaining abutments around said opening, in combination with high duty cutters arranged around said openings and having inner working points within the same, and means for removably locking said cutters to said member and whereby the thrust of the cutters in action is sustained by said blade through said abutments.

In testimony whereof I affix my signature, in presence of two witnesses.

GEORGE GORTON.

Witnesses:
C. R. CARPENTER,
C. EILANDSON.

Copies of this patent may be obtained for five cents each, by addressing the "Commissioner of Patents, Washington, D. C."